United States Patent
Giering

(10) Patent No.: US 9,340,194 B2
(45) Date of Patent: May 17, 2016

(54) ELECTROMECHANICALLY ACTUABLE MOTOR VEHICLE BRAKE WITH SELECTIVE SELF-LOCKING

(75) Inventor: Wilfried Giering, Ridgeway (CA)

(73) Assignee: Lucas Automotive GmbH, Koblenz (DE)

( * ) Notice: Subject to any disclaimer, the term of this patent is extended or adjusted under 35 U.S.C. 154(b) by 185 days.

(21) Appl. No.: 14/122,417

(22) PCT Filed: Apr. 11, 2012

(86) PCT No.: PCT/EP2012/001570
§ 371 (c)(1),
(2), (4) Date: Feb. 6, 2014

(87) PCT Pub. No.: WO2012/163447
PCT Pub. Date: Dec. 6, 2012

(65) Prior Publication Data
US 2014/0166413 A1 Jun. 19, 2014

(30) Foreign Application Priority Data
May 31, 2011 (DE) .......................... 10 2011 102 860

(51) Int. Cl.
*B60L 7/00* (2006.01)
*B60T 13/74* (2006.01)
(Continued)

(52) U.S. Cl.
CPC ............ *B60T 13/746* (2013.01); *B60T 13/741* (2013.01); *F16D 65/18* (2013.01); *F16D 2121/24* (2013.01); *F16D 2125/40* (2013.01); *F16D 2125/50* (2013.01); *F16D 2127/06* (2013.01)

(58) Field of Classification Search
CPC ............ F16D 2127/06; F16D 2121/18; F16D 2121/24; F16D 2125/20; F16D 2125/36; F16D 2125/40; F16D 2125/46; F16D 2125/48; F16D 2125/50
See application file for complete search history.

(56) References Cited

U.S. PATENT DOCUMENTS

| 4,499,787 A | 2/1985 | Leistner et al. |
| 4,953,669 A * | 9/1990 | Severinsson ............ B60T 13/04 188/158 |

(Continued)

FOREIGN PATENT DOCUMENTS

| DE | 3118634 A1 | 6/1983 |
| DE | 19654729 A1 | 7/1999 |

(Continued)

OTHER PUBLICATIONS

Machine translation of DE 102008054399 (no date).*

*Primary Examiner* — Nicholas J Lane
(74) *Attorney, Agent, or Firm* — MacMillan, Sobanski & Todd, LLC

(57) ABSTRACT

A motor vehicle brake, in particular an electromechanically actuable motor vehicle brake, having an actuator subassembly, including a housing, a servo element which is movable in relation to the housing, for moving a brake pad, a motorized drive, a movement mechanism arranged between the motorized drive and the movable servo element, a gear arrangement associated with the movement mechanism, wherein the movement mechanism has a ball screw with a spindle that can be driven in rotation and a nut that can be displaced linearly in the housing, wherein the nut may be moved, for moving the servo element, by driving the spindle in rotation within the housing. In this motor vehicle brake it is provided for the gear arrangement to have a wrap spring clutch which is arranged in the flow of force between the motorized drive and the spindle such that the wrap spring clutch permits torque to be transmitted from the motorized drive to the spindle, and is constructed to block transmission of torque from the spindle to the motorized drive.

10 Claims, 6 Drawing Sheets

(51) Int. Cl.
*F16D 65/18* (2006.01)
*F16D 121/24* (2012.01)
*F16D 125/40* (2012.01)
*F16D 125/50* (2012.01)
*F16D 127/06* (2012.01)

(56) References Cited

U.S. PATENT DOCUMENTS

| | | | |
|---|---|---|---|
| 5,931,258 A | | 8/1999 | Lorentz |
| 6,012,556 A | * | 1/2000 | Blosch ............... F16D 41/206 188/158 |
| 6,561,321 B1 | * | 5/2003 | Klode ................. F16D 65/18 188/156 |
| 8,051,957 B2 | | 11/2011 | Giering et al. |
| 8,327,981 B2 | | 12/2012 | Giering et al. |
| 8,616,348 B2 | | 12/2013 | Winkler et al. |
| 2007/0062769 A1 | * | 3/2007 | Noh .................... B60T 13/588 188/265 |
| 2009/0294224 A1 | * | 12/2009 | Sakashita ........... F16D 65/183 188/72.2 |
| 2010/0163351 A1 | | 7/2010 | Sakashita et al. |

FOREIGN PATENT DOCUMENTS

| | | | |
|---|---|---|---|
| DE | 102007046952 A1 | | 4/2009 |
| DE | 102008054399 A1 | * | 6/2010 ............ B60T 13/02 |
| DE | 102012208294 A1 | | 11/2012 |
| EP | 0334434 A2 | | 9/1989 |
| JP | 2009127737 A | | 6/2009 |
| WO | 9809084 A1 | | 3/1998 |
| WO | 2008037738 A1 | | 4/2008 |
| WO | 2009046899 A1 | | 4/2009 |

* cited by examiner

ELECTROMECHANICALLY ACTUABLE MOTOR VEHICLE BRAKE WITH SELECTIVE SELF-LOCKING

CROSS-REFERENCE TO RELATED APPLICATIONS

This application is a national stage of International Application No. PCT/EP2012/001570 filed Apr. 11, 2012, the disclosures of which are incorporated herein by reference in entirety, and which claimed priority to German Patent Application No. DE 10 2011 102 860.2 filed May 31, 2011, the disclosures of which are incorporated herein by reference in entirety.

BACKGROUND OF THE INVENTION

The invention relates to an electromechanically actuable motor vehicle brake having an actuator subassembly, including a housing, a servo element which is movable in relation to the housing, for moving a brake pad, a motorised drive, a movement mechanism arranged between the motorised drive and the movable servo element, and a gear arrangement associated with the movement mechanism, wherein the movement mechanism has a ball screw with a spindle that can be driven in rotation and a nut that can be displaced linearly in the housing, wherein the nut may be moved, for moving the brake pad, by driving the spindle in rotation within the housing.

Electromechanically actuable motor vehicle brakes of this kind are known from the prior art.

For example, WO 2008/037738 A1, and corresponding US Patent Publication No. 2009/0283371 A1, both of which are incorporated by reference herein in entirety, describes a motor vehicle brake which is actuable both hydraulically and electromechanically. In a normal service situation, that is to say when the motor vehicle is travelling, this motor vehicle brake is conventionally actuated hydraulically. To activate a parking brake, however, the electromechanical actuation function is activated. For this, an electric motor is triggered, which drives a spindle-and-nut arrangement by way of a movement mechanism with a gear arrangement. The gear arrangement is constructed with a worm gear transmission such that it is self-locking, in order to prevent the parking brake action being reduced while the parking brake is activated. However, the self-locking has the disadvantage that within the scope of its electromechanical actuation this motor vehicle brake can only be used as a parking brake. The self-locking hinders use of the electro-mechanical actuation function for application during service braking, since it would block release of the brake. Furthermore, this device provides a mechanical energy storage device which is pre-tensioned by way of the electric motor when the spindle-and-nut arrangement is actuated. The particular feature of the motor vehicle brake described in this prior art lies in the construction of the spindle-and-nut arrangement, in which the rolling bodies do not revolve but are pre-tensioned by way of a spring.

WO 2009/046899 A1, and corresponding U.S. Pat. No. 8,051,957 B2, both of which are incorporated by reference herein in entirety, also describes a motor vehicle brake which is actuable electromechanically. However, the electromechanical actuation is performed both for activation of the service braking function and for activation of the parking brake function. For this reason, the gear arrangement is constructed not to be self-locking. This motor vehicle brake has the advantage that there is no need for a complex hydraulic system for triggering it, but instead the onboard electronics of the vehicle can be used to trigger the braking system. Since the gear arrangement itself is constructed not to be self-locking, for the parking brake function a separate blocking means is provided for blocking the motor vehicle brake, by means of which a lever can be brought into a blocking position magnetically. This prior art also provides for a store of clamping force to be provided, for compensating for settling on the brake pads as a result of cooling or similar once the brake has been applied on operation of the parking brake.

Furthermore, a similar arrangement is disclosed in DE 10 2007 046 952 A1.

BRIEF SUMMARY OF THE INVENTION

A feature of the present invention is to provide an electromechanically actuable motor vehicle brake which can be used both as a service brake and as a parking brake, and which in a simple construction reliably prevents unintentional release or reduction of the parking brake action.

This feature is achieved by an electromechanically actuable motor vehicle brake of the type indicated at the outset in which it is provided for the gear arrangement to have a wrap spring clutch which is arranged in the flow of force between the motorised drive and the spindle such that the wrap spring clutch permits torque to be transmitted from the motorised drive to the spindle, and is constructed to block transmission of torque from the spindle to the motorised drive.

The invention has the advantage that using a wrap spring clutch which is arranged in the flow of force between the motorised drive and the spindle can ensure on the one hand that the torque applied by the motorised drive can be reliably transmitted to the spindle for applying or actuating the motor vehicle brake; on the other hand, the wrap spring clutch is constructed such that the reaction forces acting from the brake pad back through the spindle, which would cause the brake action to be released, for example in a parking brake situation, are reliably blocked by the wrap spring clutch. In this way, the wrap spring clutch forms a self-switching overrunning clutch which enables torque to be transmitted towards the spindle over a long period but can block the transmission of torque in the opposite direction, from the spindle to the motorised drive. This makes it possible to avoid the self-locking in the gear provided, for example, in the prior art. As a result, the electromechanical motor vehicle brake is also suitable for use as a service brake. Furthermore, this makes it possible to save on additional switching elements such as the lever mechanism from the prior art, described at the outset. In this connection, an additional trigger control for these switching elements is also dispensed with.

A further development of the invention provides for the gear arrangement to have at least two gear wheels which may be connected to one another such that torque is transmitted by way of the wrap spring clutch, by means of a wrap spring. This makes it possible to integrate the wrap spring clutch in the gear arrangement in space-saving manner and to accommodate it such that it is protected between the two gear wheels.

In this connection, it may be provided for the wrap spring clutch to have as the wrap spring a helical spring which is wrapped around a stator, which is fixed to the housing, with at least one winding and which has two ends, and which may be coupled by means of its one end to a first gear wheel such that torque is transmitted and by means of its second end to a second gear wheel such that torque is transmitted. The at least one winding in this case abuts against a surface of the stator. In this variant embodiment of the invention, it is preferably provided that each of the gear wheels has at least one respective claw which may be brought into torque-transmitting engagement with the end of the helical spring that is respectively associated with the gear wheel. These claws serve, so to speak, to couple the respective gear wheel to the helical spring arranged between them, such that force and torque are transmitted. The helical spring is the force transmitting element which allows force to be transmitted from the motorised drive to the spindle and blocks it in the opposite direction. This is achieved, according to a variant embodiment of the invention, in particular in that, when torque is transmitted from the motorised drive to the spindle, the helical spring is widened radially somewhat in relation to the stator fixed to the housing such that it slides securely on the stator when torque is transmitted, and in that the helical spring contracts radially in relation to the stator fixed to the housing in the event that torque is transmitted from the spindle to the motorised drive, during which it acts radially on the stator fixed to the housing such that it prevents the transmission of torque. During blocking, the helical spring thus tightens around the stator fixed to the housing, and hence, as a consequence of the wrapping, ensures powerful friction forces which, finally, prevent further movement and hence transmission of torque by way of the helical spring.

If the motor vehicle brake is used both as a service brake and as a parking brake, it may be necessary for functioning as a service brake to allow the transmission of torque from the spindle to the motorised drive to a certain extent. Within the context of the parking brake function, however, the transmission of torque in this way has to be prevented, for the reasons stated. This means that there are opposing requirements, so to speak, for functioning as a service brake and functioning as a parking brake. In a variant embodiment, the present invention achieves a differentiation between the service brake function and the parking brake function by exploiting the fact that substantially greater moments or clamping forces are usually used to activate the parking brake than in the context of the service brake function. Depending on the size or value, the clamping forces used may thus be "switched" between the service brake function and the parking brake function. From a constructional point of view, this switching is achieved in that in this variant embodiment there is associated with the wrap spring clutch a switching element that, in a first switch position, permits the transmission of torque from the spindle to the motorised drive and, when a second switch position is reached, causes the wrap spring clutch to block the transmission of torque from the spindle to the motorised drive. This switching element switches as a function of the acting clamping force. Here, according to the invention it is possible for the switching element to include at least one elastic deformation element. The at least one deformation element permits a transmission of force between the motorised drive and the spindle in both directions, in the context of a certain degree of deformation. Above a certain deformation, determined by the clamping force, the at least one deformation element reaches the second switch position, in which the transmission of force from the motorised drive to the spindle continues to be possible but is blocked in the opposite direction. In particular, it may be provided here for the switching element to adopt its first or second switch position in dependence on a clamping force acting on the wrap spring between the first gear wheel and the second gear wheel.

The variant embodiment having the switching element is a development of the basic concept of a mechanical overrunning clutch in the gear arrangement, as a result of which the transmission of torque is possible or blocked as a function of the direction of force transmission, but additionally provides for dependence on the currently acting clamping force, with the blocking action achieved only above a certain value of the clamping force.

As regards the concrete embodiment of the switching element, it may be provided for the at least one elastic deformation element to be formed by a shaped spring with serpentine winding. Thus, the shaped spring forms individual wraps which are loosely wound and so have the capacity for deformation. The shaped spring may be made from metal, rubber or a synthetic material.

Furthermore, according to the invention it may be provided for the gear arrangement to have a planetary gear mechanism. This allows correspondingly high torques and clamping forces to be applied and at the same time a low-power and hence compact motorised drive to be used. In this connection, it may further be provided for the motorised drive to have an electric motor whereof the output shaft is coupled to a sun gear of the planetary gear mechanism, with a hollow gear of the planetary gear mechanism being arranged fixed to the housing and planetary gears of the planetary gear mechanism being mounted such that they can rotate on a planet carrier that is mounted such that it can rotate in the housing. In this case, in a variant embodiment of the invention, it is provided for the planet carrier to act, such that torque is transmitted, on the gear wheel that is close to the drive, as seen in the direction of the flow of force. Furthermore, in this connection it may be provided for the gear wheel that is remote from the drive, as seen in the direction of the flow of force, to be coupled to the spindle such that torque is transmitted.

Other advantages of this invention will become apparent to those skilled in the art from the following detailed description of the preferred embodiments, when read in light of the accompanying drawings.

DETAILED DESCRIPTION OF THE INVENTION

Figure 1:
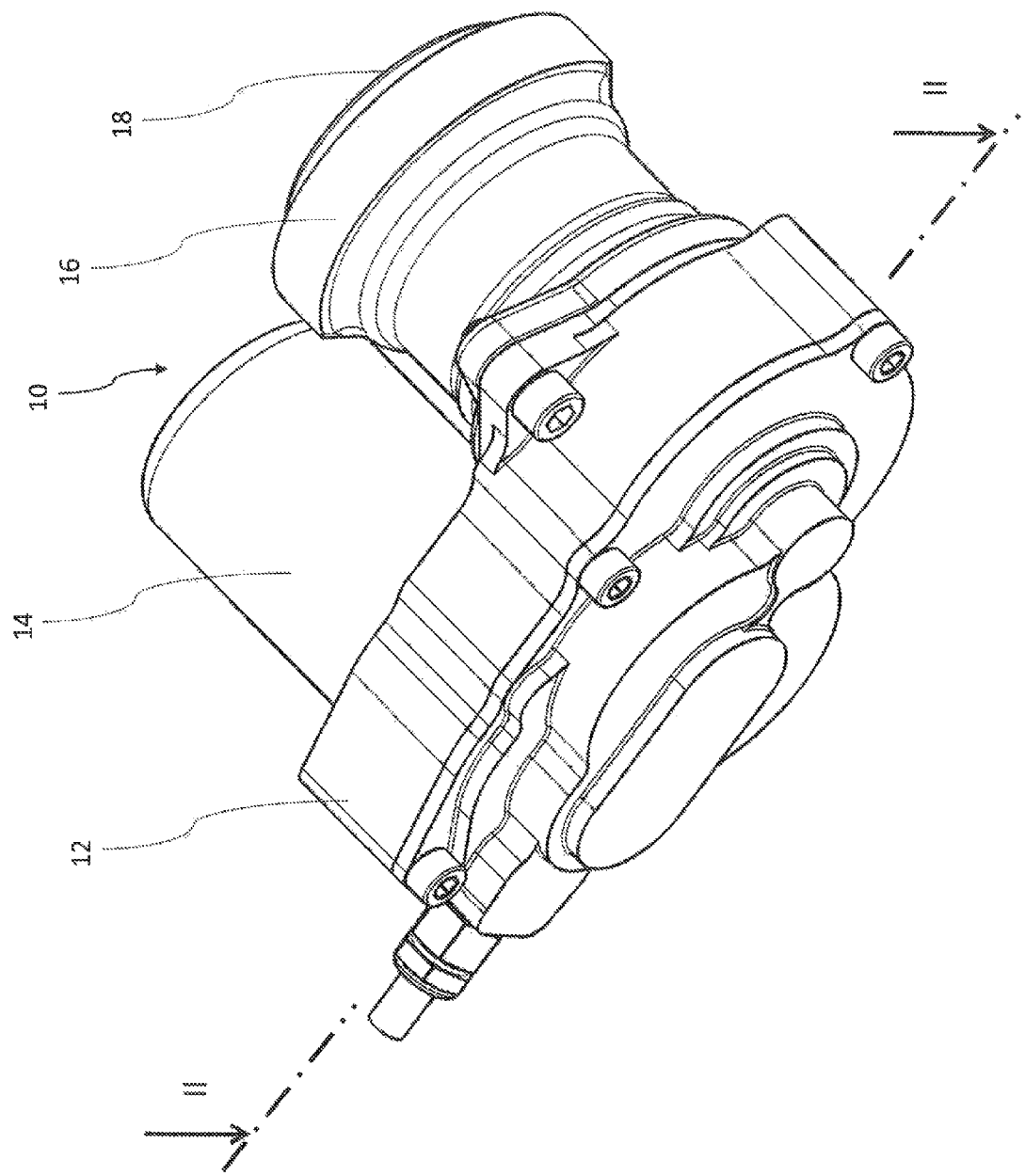
FIG. 1 shows a perspective external view of an actuator subassembly of the motor vehicle brake according to the invention.

FIG. 1 shows an actuator subassembly of a motor vehicle brake according to the invention in a perspective illustration, overall designated 10. In particular, FIG. 1 shows a housing 12, in which there is arranged a gear arrangement, a part housing 14 for accommodating a drive motor and a further part housing 16 in which there is arranged a displaceable piston 18 by means of which a brake pad (not shown) can be displaced in a brake unit of a motor vehicle brake in a manner activating braking. The actuator subassembly 10, shown in FIG. 1, of the motor vehicle brake according to the invention can be installed for example in a floating-calliper brake in conventional manner. In this respect, reference is made to WO 2009/046899 A1, where an installation situation of this kind is shown by way of example. This document is an application of the present Applicant. Because the topic of the text below is the actuator subassembly comprising motorised drive and movement mechanism for moving the brake pad, the description below concentrates on these components. In the figures, too, only corresponding components are shown.

Figure 2:
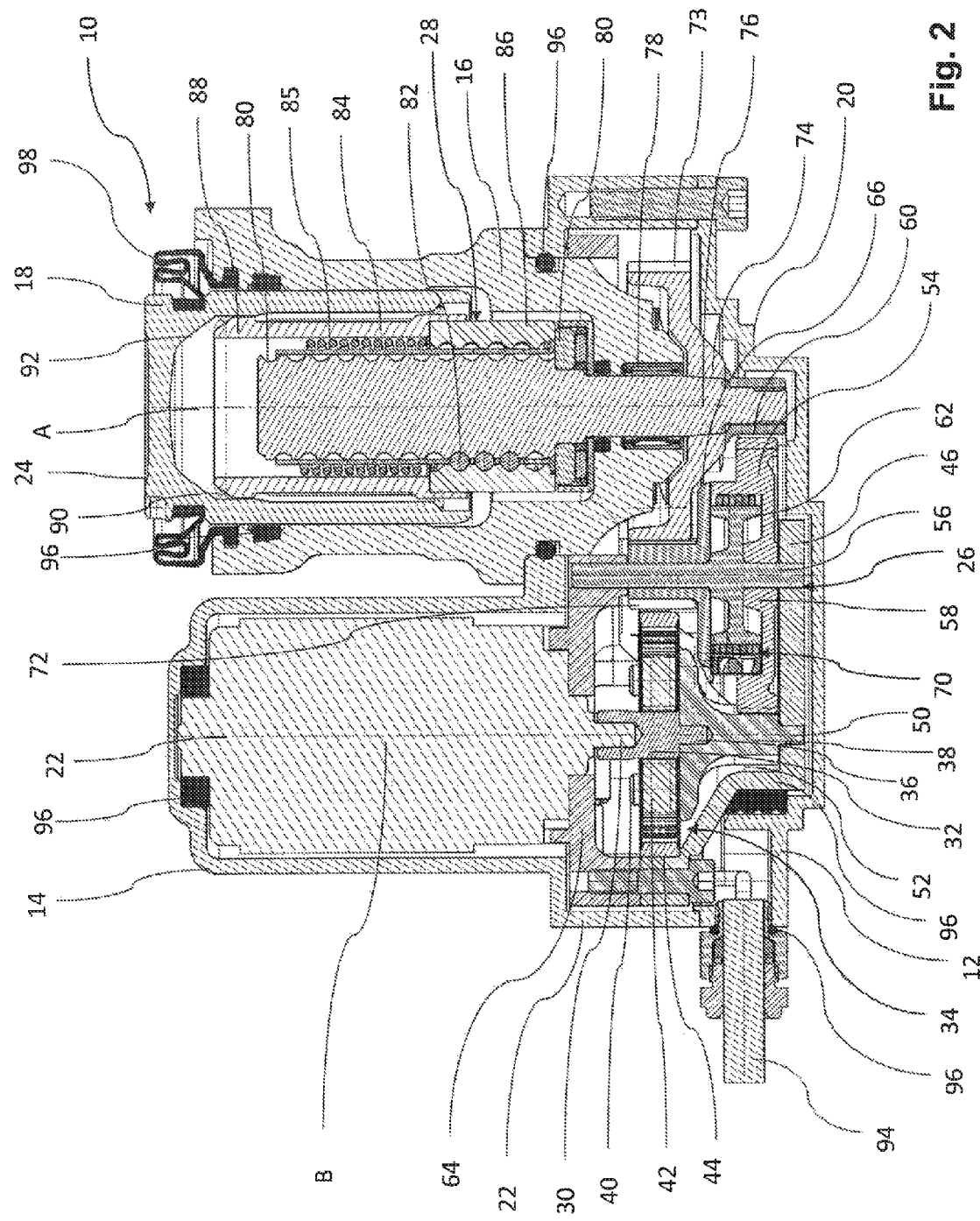
FIG. 2 shows a sectional view, including the axes, through the actuator subassembly of the motor vehicle brake according to FIG. 1.

FIG. 2 shows a cross sectional view, including the axes, through the drive unit 10 shown in FIG. 1. It is seen that the housing 12 is made up of multiple parts and composed of a housing cover 20, the part housing 14 for accommodating an electric motor 22, and the part housing 16 for movably accommodating the piston 18. The piston 18 is movable along the longitudinal axis A. Its exposed surface 24 cooperates in conventional manner with a brake pad arrangement (not shown) for achieving a braking action. The movement mechanism will be discussed in detail below.

Figure 3:
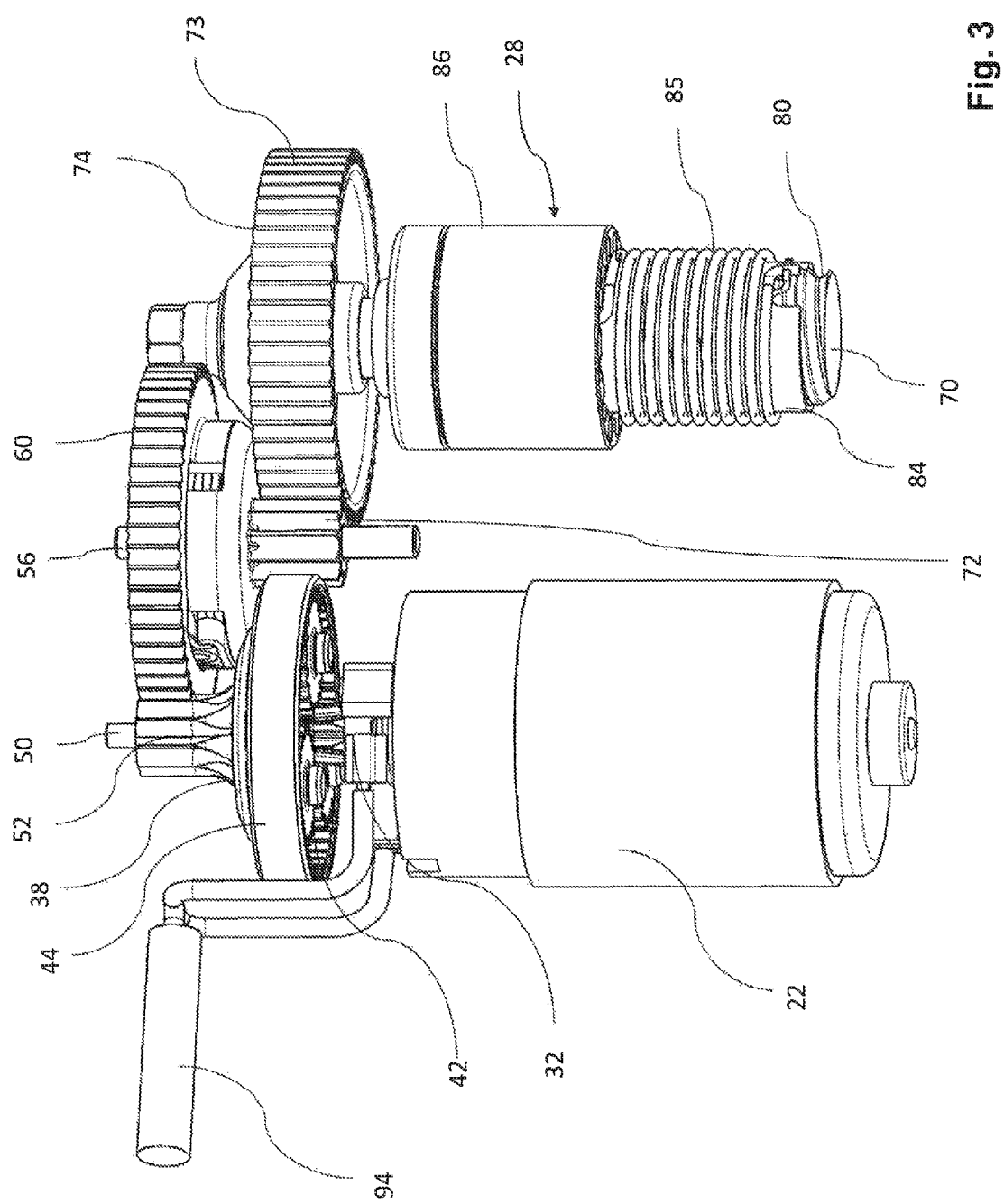
FIG. 3 shows a cutaway view of the electric motor, the gear arrangement and the spindle.

The movement mechanism includes a gear arrangement 26 and a nut-and-spindle arrangement 28. Both basic components of the movement mechanism are illustrated, together with the electric motor 22, cut away in FIG. 3. The gear arrangement 26 serves to convert a rotary movement of the electric motor 22 into a corresponding linear movement of the piston 18 along the longitudinal axis A. Specifically, the electric motor 22 has a motor output shaft 30 which extends along the motor longitudinal axis B. This shaft is coupled non-rotatably to a toothed gear 32. The toothed gear 32 serves as a sun gear of a planetary gear 34. The toothed gear 32 has, at its end remote from the motor, a bearing pin 36. Mounted rotatably on this bearing pin 36 is a planet carrier 38 which for its part has a plurality of bearing pins 40. The bearing pins 40 serve to mount planetary gears 42 which are in meshing engagement with the toothed gear 32.

A hollow gear 44 is arranged fixed to the housing, radially outside the planetary gears 42. For this purpose there serves a further housing part 46. The planetary gear 38 is mounted rotatably in this housing part 46 by means of a bearing pin 50. Between the bearing pins 40 and its bearing pins 50 it has an external toothing 52. This external toothing 52 meshes with a first gear wheel 54 which is mounted rotatably on a stator 56, fixed to the housing, by way of a radially inner bearing portion 58 and has on its outer periphery an external toothing 60. The gear wheel 54 is in the form of a cup. In its interior there extends a friction gear portion 62 which is integrally formed on the stator 56 and is thus also mounted non-rotatably in the housing 12, in particular non-rotatably on the housing part 46 and a further housing part 64, for example by being pushed in. A second gear wheel 66 is mounted rotatably on the stator 56. This second gear wheel 66 may be coupled to the first gear wheel 54 by way of a wrap spring clutch 70, for transmitting torque. This will be discussed in more detail below. The second gear wheel 66 has on its portion remote from the first gear wheel 54 an external toothing 72. The latter meshes with an external toothing 73 of a take-off gear wheel 74 which is mounted non-rotatably on a spindle 76 of the nut-and-spindle arrangement 28.

It is seen in FIG. 2 that the spindle 76 is mounted by way of a radial needle bearing 78 and an axial bearing in the housing part 16. The spindle 76 has on its outer periphery a threaded formation 80 in which rolling elements 82 are accommodated. The rolling elements 82 are held in a rolling element cage 84 which, by way of a helical spring 85, is pre-tensioned into its initial position, shown in FIGS. 2 and 3. Borne on the rolling elements 82 is a nut 86 which, on rotary movement of the spindle 76, performs a linear movement within the housing part 16, in conventional manner. The nut 86 is fixedly connected to a coupling element 88 which moves with the nut 86 in the event of a movement of the latter. The coupling element 88 has on its free end a conical coupling face 90 which may be brought into engagement with a corresponding piston face 92 in the interior of the piston 18 and may be displaced together with the piston 18 for the movement thereof and hence for the movement of the brake pad (not shown).

Further seen in FIG. 2 is a connection cable 94 and various seals 96 for sealing the housing parts to one another and components connected thereto, and for guiding them in sealed manner. Finally, it is also seen that the piston 18 is sealed by a bellows 98.

FIGS. 2, 3 and 8 and 9 show details of the movement mechanism.

Turning now to FIGS. 4 to 7, seen therein are the construction and the individual components of the wrap spring clutch 70. Provided in the interior of the wrap spring clutch 70 is the stator 56, with its friction gear portion 62. As stated above, the stator 56 is mounted fixed to the housing and hence non-rotatably in the housing by way of two bearing pins 102, 104. Mounted on the stator 56 is the first gear wheel 54. The latter has on its outer periphery the external toothing 60 and is provided with a hollow space 106 in its interior. The hollow space 106 is provided with a lateral pocket 108 having an abutment face 110. Furthermore, a claw 112 in the shape of a circle segment extends out of a lateral face of the first gear wheel 54.

Figure 4:
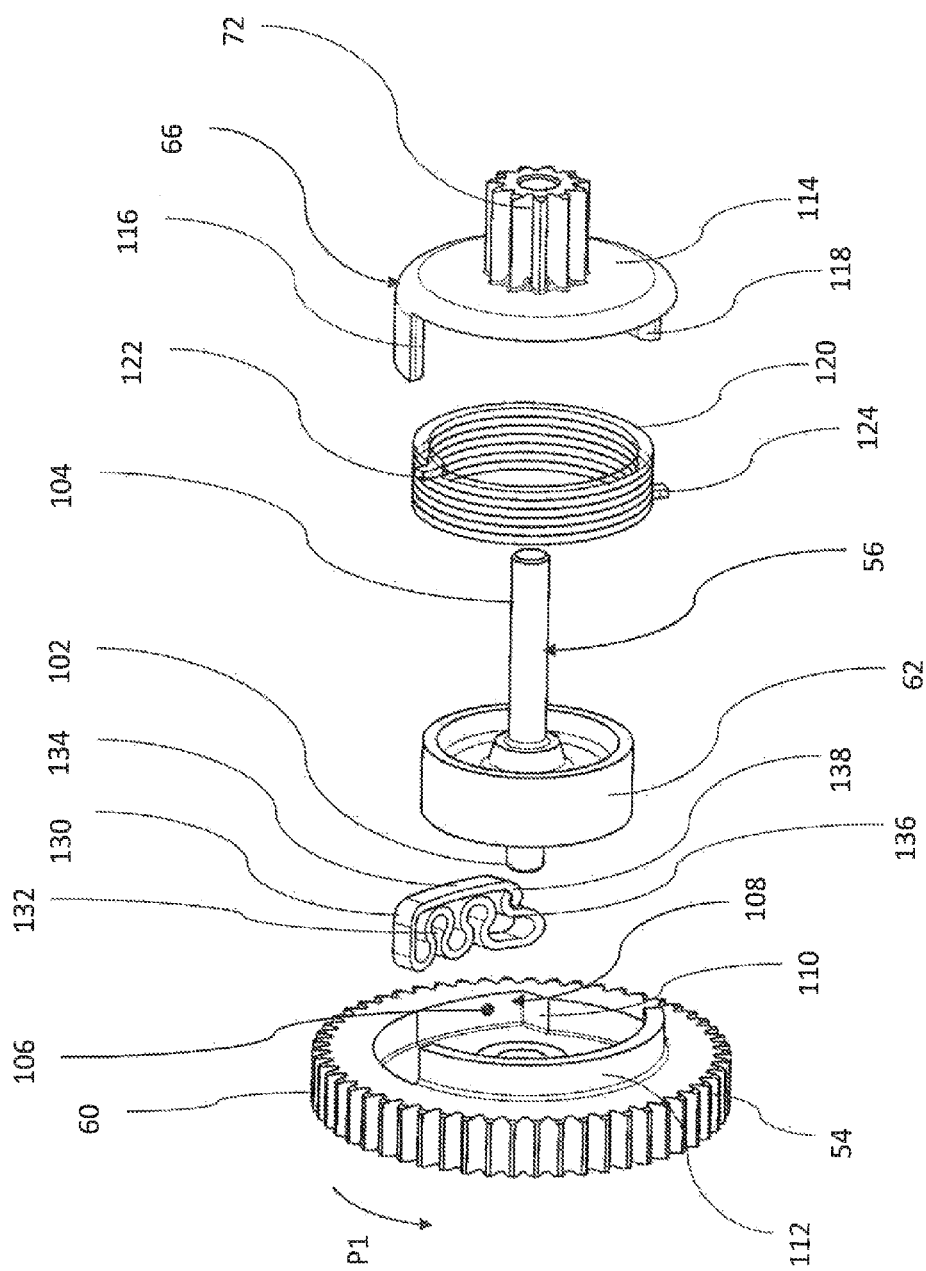
FIG. 4 shows an exploded view to explain the wrap spring clutch.
Figure 6:
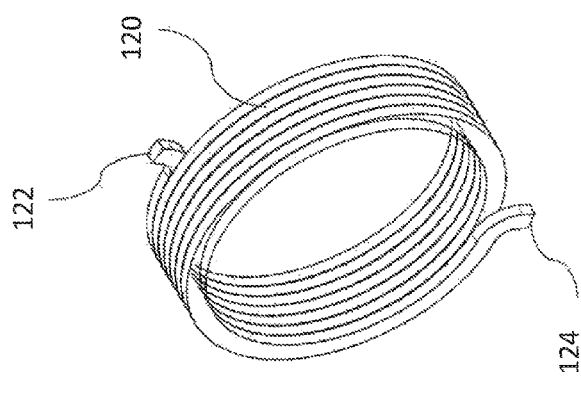
FIG. 6 shows a perspective view of the wrap spring.
Figure 7:
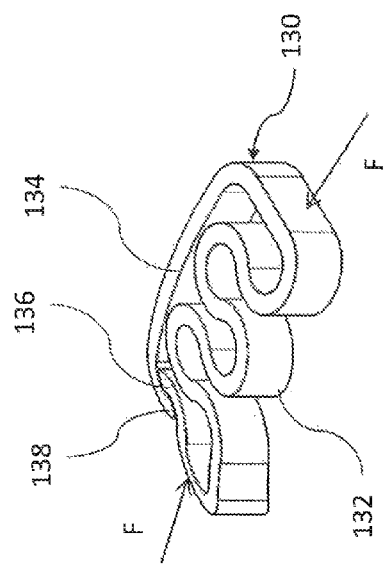
FIG. 7 shows a perspective view of the shaped spring.

In addition to its external toothing 72, the second gear wheel 66 has a plate-like structure 114 on which there are arranged a first claw 116 and a second claw 118 which extend in the axial direction. Furthermore seen in FIG. 4 is a helical spring 120 with bent ends 122 and 124. The helical spring 120 is dimensioned such that in the relaxed condition it abuts snugly against the outer peripheral face of the friction gear portion 62 but can slide on the latter. For assembly, the helical spring 120 is pushed onto the friction gear portion 62. This arrangement is accommodated in the hollow space 106. The two bent ends 122 and 124 extend radially outwards far enough to be brought into engagement with the claws 112, 116, 118—as will be described in detail below—without scratching or rubbing along the faces adjoining the hollow space 106.

Furthermore seen in FIG. 4 is a shaped spring 130 having a plurality of wound loops 132 which extend along a base line 134. The two ends 136, 138 engage in one another. If a force F is applied, the wound loops 132 can be compressed out of their relaxed position into a compressed position. The shaped spring 130 is arranged in the pocket 108 and abuts against the abutment face 110 by means of its final loop.

Figure 5:
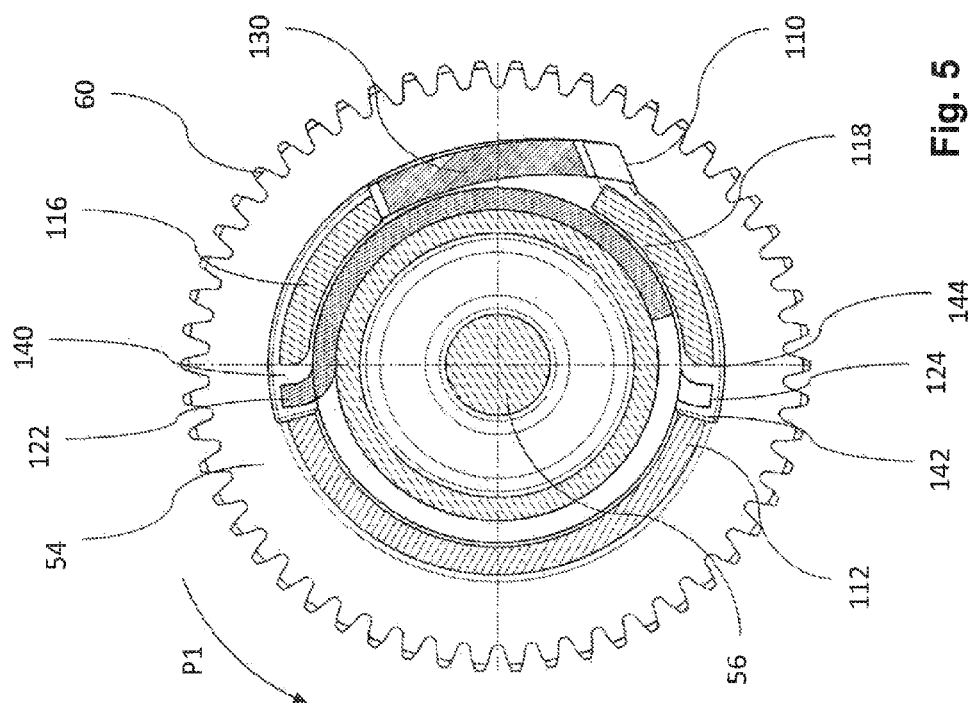
FIG. 5 shows a sectional view at right angles to the axes, of the arrangement comprising two gear wheels with wrap spring clutch.
Figure 8:
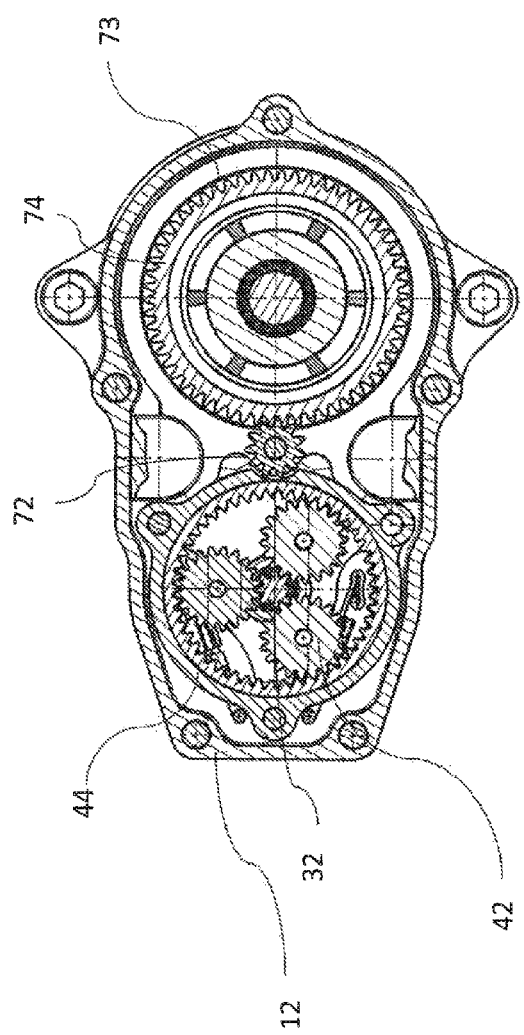
FIG. 8 shows a sectional view, at right angles to the axes, through the actuator subassembly of the disc brake according to the invention according to FIG. 2, along the line of section VIII-VIII.
Figure 9:
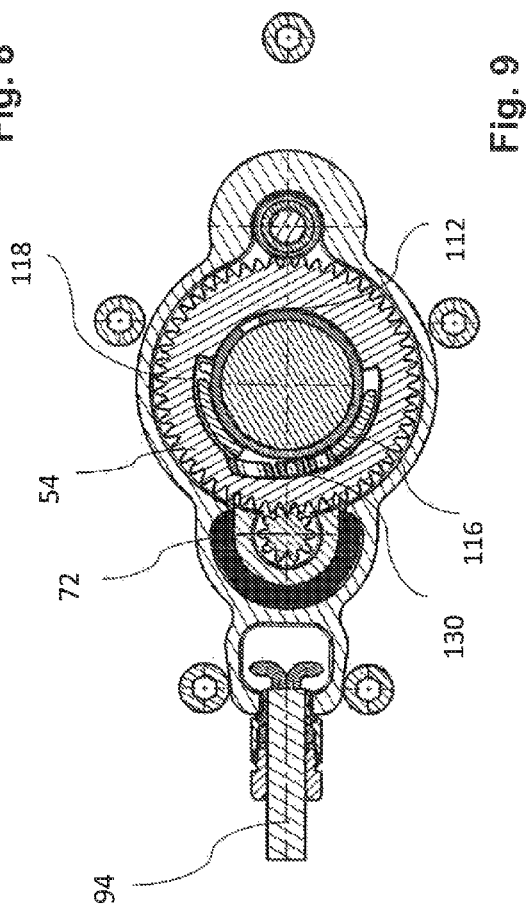
FIG. 9 shows a sectional view, at right angles to the axes, through the actuator subassembly of the disc brake according to the invention according to FIG. 2, along the line of section IX-IX.

Seen in FIG. 5 is the assembled condition of the wrap spring clutch 70, and in this regard it should be added that the bent spring end 122 is accommodated in the intermediate space 140 between the claw 116 and the claw 118.

In general, the motor vehicle brake described above, with its actuator subassembly described above, is used both for activating a service brake function and for activating a parking brake function. This means that in the case of service braking the piston 18 is moved by way of the electric motor 22, by means of the gear arrangement 26 and the nut-and-spindle arrangement 28, such that it is moved out of the housing part 16. Similarly, it must be possible for the piston 18 to be moved back into its initial position according to FIG. 2, when the motor 22 is released, in order to release the brake in the case of service braking. Typically, this is done solely by the action of relaxation at the brake pad (not shown) and by means of the restoring spring 85, without the need for this purpose for motorised driving by the electric motor 42. This corresponds to the function of hydraulic movement of a corresponding brake piston, in which similarly the brake piston need not be retracted actively by the generation of a hydraulic negative pressure. In the case of service braking, it should be noted that relatively low clamping forces are required.

In a parking brake situation, the piston 18 is moved with a relatively high clamping force, to generate a parking brake action, and should be held in this position over a long period in order to keep the motor vehicle securely immobile. It is imperative to maintain the piston position which is reached, and the possibility that the piston 18 may move back over time as a result of settling in the gear arrangement 26 must be avoided. Only once the motor 22 actively triggers an active release of the parking brake may the piston 18 again move back into its initial position according to FIG. 2.

A distinction must therefore be made between the service brake situation and the parking brake situation, wherein depending on the current condition of the brake a flow of force from the piston 16 to the motor 22 is to be permitted (service brake) or prevented (parking brake). To meet this requirement, the wrap spring clutch 70 is used in the manner shown. The wrap spring clutch 70 functions through an interaction with the two gear wheels 54 and 66, as follows:

First, the flow of force from the gear wheel 54 on the motor side should be considered, that is to say the case in which the motor 22 is driven and the gear wheel 54 is driven in rotation by means of the planetary gear 34. Here, there are two directions of rotation, namely the direction of rotation of the gear wheel 54 anti-clockwise, for clamping the brake (application of the service brake and the parking brake), and the direction of rotation of the gear wheel 54 clockwise, for actively releasing the brake (release of the parking brake).

When the first gear wheel 54 is rotated anti-clockwise, according to the arrow P1—which corresponds to a movement for moving the piston 18 out of the housing 16, that is to say for activating the brake by way of the motor 22 in both a service brake situation and a parking brake situation—the shaped spring 130 is displaced in opposition to the claw 116, by way of the abutment face 110. The greater the resistance offered by the claw 116 to a displacement of this kind (that is to say as clamping forces increase), the more the shaped spring 130 is compressed. During this actuation anti-clockwise, according to the arrow P1, the helical spring 120 remains ineffective, because its spring ends can move freely in the space between the claws 112, 116 and 118 and it slides on the friction gear portion 62.

In a service brake situation, the clamping forces occurring at the piston are relatively small, so that there is at most a small deformation of the shaped spring 130. If relatively large clamping forces occur, as is the case when the parking brake is activated, when the brake pads have to be pressed powerfully against the brake disc by way of the piston 18, the shaped spring 130 is compressed to a greater extent. If the shaped spring 130 is compressed to a relatively great extent as a consequence of rotation according to the arrow P1, this means that the first gear wheel 54 has moved in relation to the second gear wheel 56, in accordance with compression of the shaped spring 130. The maximum relative movement is determined by the claw 112 abutting by means of its end face 142, by way of the bent end 124, against the claw 118 and the end face 144 thereof. Once this condition has been reached, the shaped spring 130 is compressed to the maximum extent and any further rotation of the electric motor 22 is transmitted by way of the gear arrangement 26 to the nut-and-spindle arrangement 28, for further clamping of the parking brake.

Once the parking brake is clamped on, reaction forces resulting from the clamping force react back onto the gear. These reaction forces, which are transmitted by way of the nut-and-spindle arrangement 28, the take-off gear wheel 74 and the external toothing 72 to the claws 116 and 118, attempt to push the claws 116, 118 back into their initial position, that is to say to move them anti-clockwise. However, as soon as the claw 116 attempts to return to its initial condition, that is to say to move anti-clockwise, it comes into engagement with the bent end 122 of the helical spring 120. As a consequence of this mutual engagement, when there is a tendency of the claw 116 to move anti-clockwise the helical spring 120 is tightened around the friction gear portion 62, with the result that its loops narrow and act more powerfully on the outer peripheral face of the friction gear portion 62. This wrapping around the outer peripheral face of the friction gear portion 62 has the result that the helical spring 120 can no longer slide on this outside peripheral face, but holds firmly against it, so to speak. Consequently, the claw 116 cannot move back into its initial position. The parking brake remains activated. This rules out the possibility of settling.

To release the parking brake, the motor 22 has to be triggered again. This is done by the gear wheel 54 being turned clockwise. If the gear wheel 54 moves clockwise, according to the arrow P2—this corresponds to movement for moving the piston 18 into the housing 16, that is to say for actively releasing the brake by way of the motor 22 when the parking brake is deactivated—then the claw 112 accordingly also moves clockwise and releases the clamping against the shaped spring 130. Moreover, the helical spring 120 is released and frees the claw 118. The latter—following the claw 112—can move back, under the action of the restoring spring 85.

The wrap spring clutch 70 thus has the general effect of ensuring that for the parking brake function torque is transmitted from the motor to the nut-and-spindle arrangement even when there are strong clamping forces, and that settling effects or unintentional release of the parking brake as a result of the action of the wrap spring clutch 70, in particular as a result of the action of the helical spring 120 which then tightens and acts firmly on the outer peripheral face of the friction gear portion 62, is prevented. If only a parking brake function is to be implemented, the shaped spring 130 is optional and may be dispensed with.

If the brake is to be used to provide both a service brake function and a parking brake function through electromechanical activation, then the shaped spring 130, which deforms to a greater or lesser extent as a function of the current clamping condition, is additionally used. In the case of small clamping forces, as usually occur during service braking, the shaped spring 130 will not be deformed at all or only to a small extent, such that it keeps the helical spring 120 (wrap spring) inactive, so to speak. This can prevent self-locking in the gear for the service brake function. In this case, a flow of force through the gear is possible in both directions between the motorised drive and the nut-and-spindle arrangement. Only once the shaped spring 130 is compressed sufficiently powerfully does the function of the helical spring 120 (wrap spring) become active, so to speak, and block a flow of force through the gear from the nut-and-spindle arrangement to the electric motor. Thus, the shaped spring 130 is required in the embodiment shown because both brake functions—the service brake function and the parking brake function—are to be provided.

The embodiment described above shows a relatively simple construction for an actuation mechanism of a motor vehicle brake which enables, where necessary, automatic switching on and switching off of self-locking in the gear as a function of clamping conditions. Switching means that may be actively triggered are not necessary for this. The basic function of the wrap spring clutch for maintaining a parking brake condition, as described above, is also ensured to a sufficient extent if the vehicle brake is not to have an electromechanically activated service brake function and only the parking brake function is to be performed electromechanically.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electromechanically actuable motor vehicle brake having an actuator subassembly comprising:
   a housing,
   a servo element which is movable in relation to the housing, for moving a brake pad,
   a motorised drive,
   a movement mechanism arranged between the motorised drive and the movable servo element, and
   a gear arrangement associated with the movement mechanism,
   wherein the movement mechanism has a ball screw with a spindle that can be driven in rotation and a nut that can be displaced linearly in the housing, wherein the nut may be moved, for moving the servo element, by driving the spindle in rotation within the housing,
   wherein the gear arrangement has a wrap spring clutch which is arranged in a flow of force between the motorised drive and the spindle such that the wrap spring clutch permits torque to be transmitted from the motorised drive to the spindle, and is constructed to block transmission of torque from the spindle to the motorised drive, wherein the gear arrangement has at least two gear wheels which may be connected to one another such that torque is transmitted by way of the wrap spring clutch, by means of a wrap spring, wherein the wrap spring has a helical spring which is wrapped around a stator, which is fixed to the housing, with at least one winding and which has two ends, and which may be coupled by means of one of the two ends to a first gear wheel such that torque is transmitted and by means of the other one of the two ends to a second gear wheel such that torque is transmitted, and wherein, when torque is transmitted from the motorised drive to the spindle, the helical spring is widened radially in relation to the stator fixed to the housing such that it slides on the stator when torque is transmitted, and in that the helical spring contracts radially in relation to the stator fixed to the housing in the event that torque is transmitted from the spindle to the motorised drive, during which it acts radially on the stator fixed to the housing such that it prevents the transmission of torque.

2. The motor vehicle brake according to claim 1, wherein each of the gear wheels has at least one respective claw which may be brought into torque-transmitting engagement with the end of the helical spring that is respectively associated with the gear wheel.

3. The motor vehicle brake according to claim 1, wherein there is associated with the wrap spring clutch a switching element that, in a first switch position, permits the transmission of torque from the spindle to the motorised drive and, when a second switch position is reached, causes the wrap spring clutch to block the transmission of torque from the spindle to the motorised drive.

4. The motor vehicle brake according to claim 3, wherein the switching element includes at least one elastic deformation element.

5. The motor vehicle brake according to claim 4, wherein the at least one elastic deformation element is formed by a shaped spring with serpentine winding.

6. The motor vehicle brake according to claim 3, wherein the switching element adopts its first or second switch position in dependence on a clamping force acting on the wrap spring between the first gear wheel and the second gear wheel.

7. The motor vehicle brake according to claim 1, wherein the gear arrangement has a planetary gear mechanism.

8. The motor vehicle brake according to claim 7, wherein the motorised drive has an electric motor whereof an output shaft has a sun gear of the planetary gear mechanism, with a hollow gear of the planetary gear mechanism being arranged fixed to the housing and planetary gears of the planetary gear mechanism being mounted such that they can rotate on a planet carrier that is mounted such that it can rotate in the housing.

9. The motor vehicle brake according to claim 8, wherein the planet carrier acts, such that torque is transmitted, on the gear wheel that is close to the motorised drive, as seen in the direction of the flow of force.

10. The motor vehicle brake according to claim 9, wherein a gear wheel that is remote from the motorised drive, as seen in the direction of the flow of force, is coupled to the spindle such that torque is transmitted.

* * * * *